United States Patent
Zheng et al.

(10) Patent No.: US 11,121,436 B2
(45) Date of Patent: *Sep. 14, 2021

(54) SECONDARY BATTERY

(71) Applicant: CONTEMPORARY AMPEREX TECHNOLOGY CO., LIMITED, Ningde (CN)

(72) Inventors: Yulian Zheng, Ningde (CN); Chengyou Xing, Ningde (CN); Zhijun Guo, Ningde (CN); Peng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 77 days.

This patent is subject to a terminal disclaimer.

(21) Appl. No.: 16/708,242

(22) Filed: Dec. 9, 2019

(65) Prior Publication Data

US 2020/0119327 A1   Apr. 16, 2020

Related U.S. Application Data

(63) Continuation of application No. 15/816,975, filed on Nov. 17, 2017, now Pat. No. 10,586,971.

(30) Foreign Application Priority Data

Dec. 2, 2016   (CN) .......................... 201621319939.5

(51) Int. Cl.
*H01M 50/531* (2021.01)
*H01M 50/534* (2021.01)
(Continued)

(52) U.S. Cl.
CPC ....... *H01M 50/531* (2021.01); *H01M 50/116* (2021.01); *H01M 50/147* (2021.01);
(Continued)

(58) Field of Classification Search
None
See application file for complete search history.

(56) References Cited

U.S. PATENT DOCUMENTS

2003/0232243 A1   12/2003   Hong
2012/0034513 A1   2/2012   Kim
2015/0243960 A1   8/2015   Imanishi et al.

FOREIGN PATENT DOCUMENTS

CN   102035186 A   4/2011
CN   102208594 B   4/2015
(Continued)

OTHER PUBLICATIONS

Contemporary Amperex Technology Co., Limited, Extended European Search Report, EP17204008.1, dated Jan. 30, 2018, 9 pgs.
(Continued)

*Primary Examiner* — Tracy M Dove
(74) *Attorney, Agent, or Firm* — Morgan, Lewis & Bockius LLP (57) ABSTRACT

The present disclosure provides a secondary battery which comprises a cap plate, an electrode assembly, a first connecting piece and a first welding protecting piece. The cap plate is provided with a first electrode terminal. The electrode assembly comprises a main body and a first electrode tab provided to the main body, the first electrode tab comprises a first connecting portion. The first connecting piece is connected between the first connecting portion and the first electrode terminal. The first welding protecting piece is provided on the first connecting portion, the first connecting portion is positioned between the first welding protecting piece and the first connecting piece, and the first welding protecting piece, the first connecting portion and the first connecting piece are securely connected.

14 Claims, 5 Drawing Sheets

(51) Int. Cl.
*H01M 50/536* (2021.01)
*H01M 50/116* (2021.01)
*H01M 50/147* (2021.01)
*H01M 50/172* (2021.01)
*H01M 50/578* (2021.01)
*H01M 50/103* (2021.01)

(52) U.S. Cl.
CPC ....... *H01M 50/172* (2021.01); *H01M 50/578* (2021.01); *H01M 50/103* (2021.01); *H01M 2200/00* (2013.01)

(56) References Cited

FOREIGN PATENT DOCUMENTS

| | | |
|---|---|---|
| CN | 205429058 U | 8/2016 |
| JP | 2013161686 A | 8/2013 |
| JP | 2015032549 A | 2/2015 |

OTHER PUBLICATIONS

Yulian Zheng et al, Non-final office action, U.S. Appl. No. 15/816,975, dated Mar. 21, 2019, 11 pgs.

SECONDARY BATTERY

CROSS-REFERENCE TO RELATED APPLICATIONS

The present application is a continuation of U.S. patent application Ser. No. 15/816,975, filed on Nov. 17, 2017, entitled "SECONDARY BATTERY", which claims priority to Chinese patent application No. 201621319939.5, filed on Dec. 2, 2016, entitled "SECONDARY BATTERY", all of which are incorporated herein by reference in their entirety.

FIELD OF THE PRESENT DISCLOSURE

The present disclosure relates to the field of battery, and particularly relates to a secondary battery.

BACKGROUND OF THE PRESENT DISCLOSURE

The secondary battery generally comprises an electrode assembly, a case receiving the electrode assembly and a cap plate, an electrode tab of the electrode assembly is fixed to an electrode terminal of the cap plate by welding (specifically, the electrode tab can be connected with the electrode terminal directly, and the electrode tab also can be connected with the electrode terminal via a connecting piece), then the electrode assembly is put into the case.

SUMMARY OF THE PRESENT DISCLOSURE

The present disclosure provides a secondary battery, which comprises a cap plate, an electrode assembly, a first connecting piece and a first welding protecting piece. The cap plate is provided with a first electrode terminal. The electrode assembly comprises a main body and a first electrode tab provided to the main body, the first electrode tab comprises a first connecting portion. The first connecting piece is connected between the first connecting portion and the first electrode terminal. The first welding protecting piece is provided on the first connecting portion, the first connecting portion is positioned between the first welding protecting piece and the first connecting piece, and the first welding protecting piece, the first connecting portion and the first connecting piece are securely connected. The first welding protecting piece can protect the first connecting portion during welding, and improve connection strength between the first connecting portion and the first connecting piece.

Reference numerals in figures are represented as follows:
1 cap plate
11 first electrode terminal
12 second electrode terminal
2 electrode assembly
21 first electrode tab
211 first connecting portion
212 first bending portion
22 second electrode tab
221 second connecting portion
222 second bending portion
23 main body
3 first connecting piece
4 first welding protecting piece
5 second connecting piece
6 case
7 insulating frame
71 side edge
8 second welding protecting piece
S1 first insulating adhesive
S2 second insulating adhesive
S3 third insulating adhesive
S4 fourth insulating adhesive
L length direction
H height direction
W width direction

DETAILED DESCRIPTION

Hereinafter a secondary battery according to the present disclosure will be described in detail in combination with the figures.

Referring to FIGS. 1-9, a secondary battery according to the present disclosure comprises: a cap plate 1 provided with a first electrode terminal 11 and a second electrode terminal 12 which are opposite in electrical polarity; an electrode assembly 2 comprising a main body 23, a first electrode tab 21 and a second electrode tab 22, the first electrode tab 21 and the second electrode tab 22 are provided to the main body 23 and opposite in electrical polarity; a first connecting piece 3 connected in series between the first electrode tab 21 and the first electrode terminal 11. The second electrode tab 22 is electrically connected with the second electrode terminal 12. The first electrode tab 21 includes a first connecting portion 211 and a first bending portion 212, the first connecting portion 211 is welded with the first connecting piece 3, and the first bending portion 212 is bent downwardly and connected between the main body 23 of the electrode assembly 2 and the first connecting portion 211. The secondary battery further comprises a first insulating adhesive S1 adhered on weld zones which are formed during welding of the first connecting portion 211 and the first connecting piece 3 and face the main body 23 of the electrode assembly 2.

In the secondary battery according to the present disclosure, the first insulating adhesive S1 can cover the weld zones facing the main body 23 of the electrode assembly 2, so the first insulating adhesive S1 can isolate the weld zones from the main body 23 or the first bending portion 212, and avoid the weld zones damaging the main body 23 of the electrode assembly 2 or the first bending portion 212 in an assembling process and a working process of the secondary battery, thereby improving safety performance of the secondary battery. At the same time, the first insulating adhesive S1 is fixed to the weld zones by adhering, so the assembling process is simple and the stability is good; compared to the prior art, a thickness of the first insulating adhesive S1 is small, thereby saving space and improving the energy density of the secondary battery. Moreover, the first insulating adhesive S1 also can avoid short circuit caused by contact between the weld zones and the main body 23 of the electrode assembly 2 (that is an electrode plate of the main body 23 which is opposite to the first electrode tab 21 in electrical polarity).

In the secondary battery according to the present disclosure, the welding can be laser welding, ultrasonic welding and the like, the weld zones are uneven surfaces formed at two sides of welded portions in a height direction H, the weld zones at a lower side in the height direction H face the main body 23 of the electrode assembly 2, and the first insulating adhesive S1 is adhered on the weld zones at the lower side in the height direction H.

In the secondary battery according to the present disclosure, referring to FIG. 1, FIG. 4, FIG. 5 and FIG. 6, a second insulating adhesive S2 is adhered on an outside portion of the first bending portion 212. In the assembling process of the secondary battery, in order to improve the energy density of the secondary battery, the first bending portion 212 will be pressed down and bent, and the outside portion of the first bending portion 212 will easily contact a later described case 6 and the main body 23 of the electrode assembly 2, thereby resulting in short circuit; however, it can avoid the outside portion of the first bending portion 212 contacting the case 6 and the main body 23 of the electrode assembly 2 by provision of the second insulating adhesive S2 adhered on the outside portion of the first bending portion 212, thereby preventing short circuit and improving the safety performance of the secondary battery.

Figure 6:
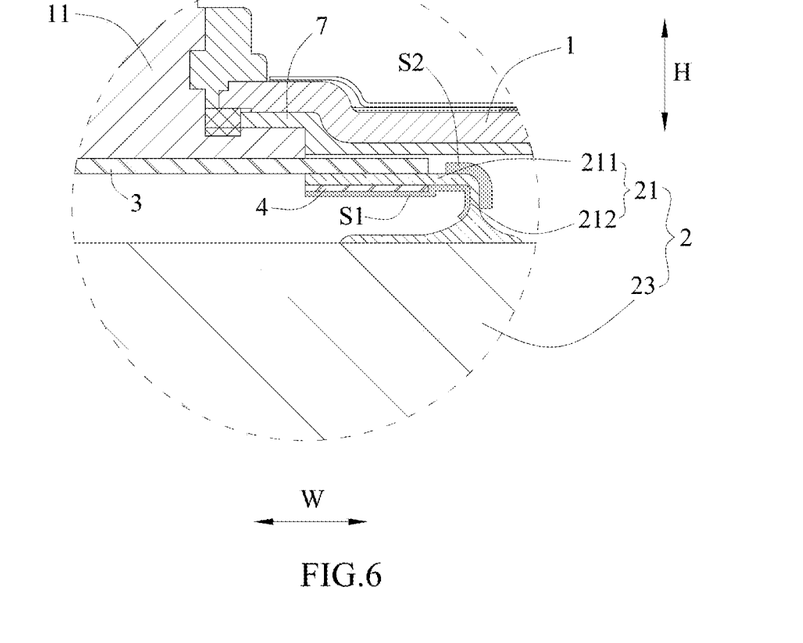

In the secondary battery according to the present disclosure, referring to FIG. 6, an angle between the first connecting portion 211 and the first bending portion 212 ranges from 85 degrees to 95 degrees. At this time, the first bending portion 212 extends nearly along the height direction H, so as to prevent the first bending portion 212 from being pressed down and bent, avoid the outside portion of the first bending portion 212 contacting the later described case 6 and the main body 23 of the electrode assembly 2.

Figure 4:
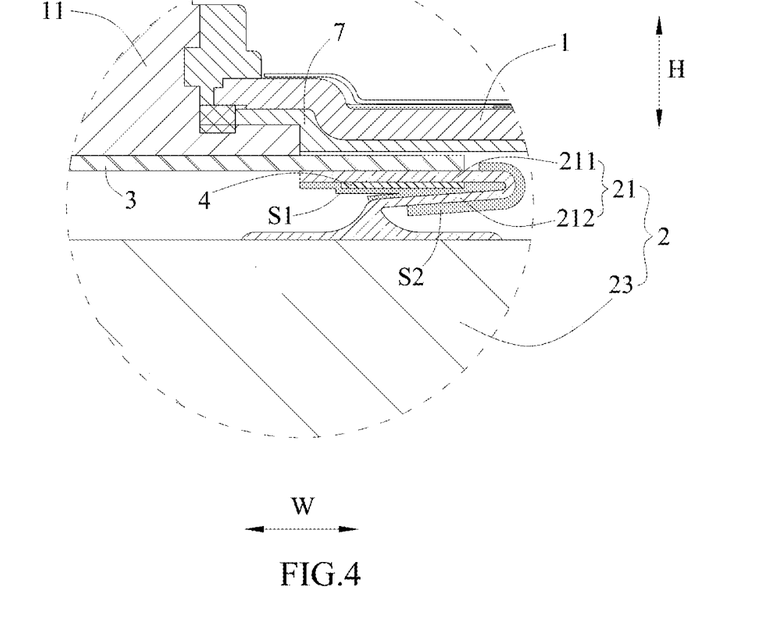
FIGS. 4-6 are schematic views of different embodiments of a first electrode tab of the secondary battery according to the present disclosure.
Figure 5:
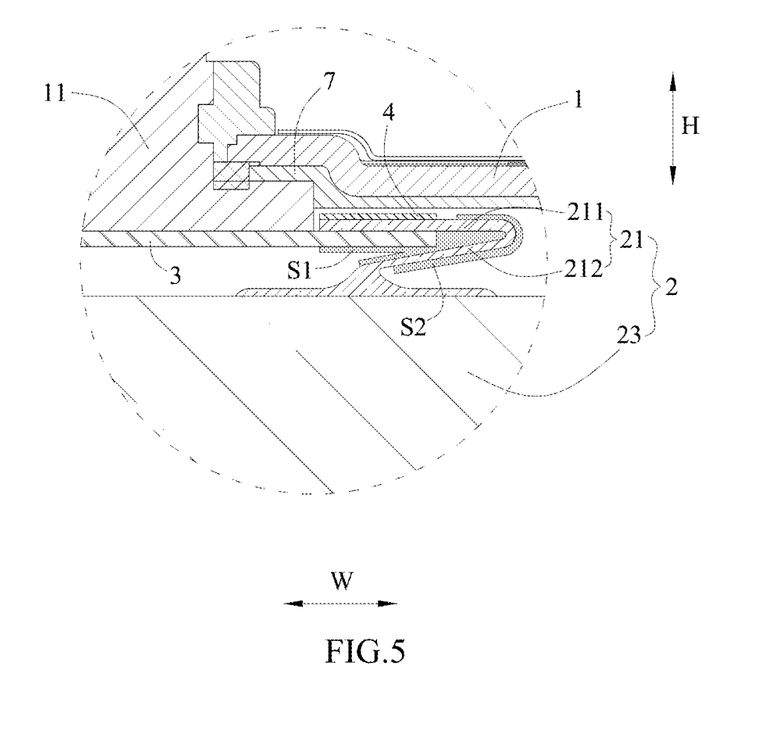

In the secondary battery according to the present disclosure, referring to FIG. 4 and FIG. 5, the angle between the first connecting portion 211 and the first bending portion 212 ranges from 0 degrees to 45 degrees. At this time, the first bending portion 212 nearly folds back onto the first connecting portion 211, thereby effectively reducing the space occupied by the first bending portion 212, and promoting a utilization rate of the space inside the secondary battery.

In the secondary battery according to the present disclosure, referring to FIG. 4, the first connecting portion 211 is positioned below the first connecting piece 3 in the height direction H, and an upper surface of the first connecting portion 211 is securely connected with a lower surface of the first connecting piece 3. At this time, both a lower surface of the first connecting portion 211 and an upper surface of the first connecting piece 3 are formed with weld zones, and the first insulating adhesive S1 is provided on the weld zones in the lower surface of the first connecting portion 211.

Figure 3:
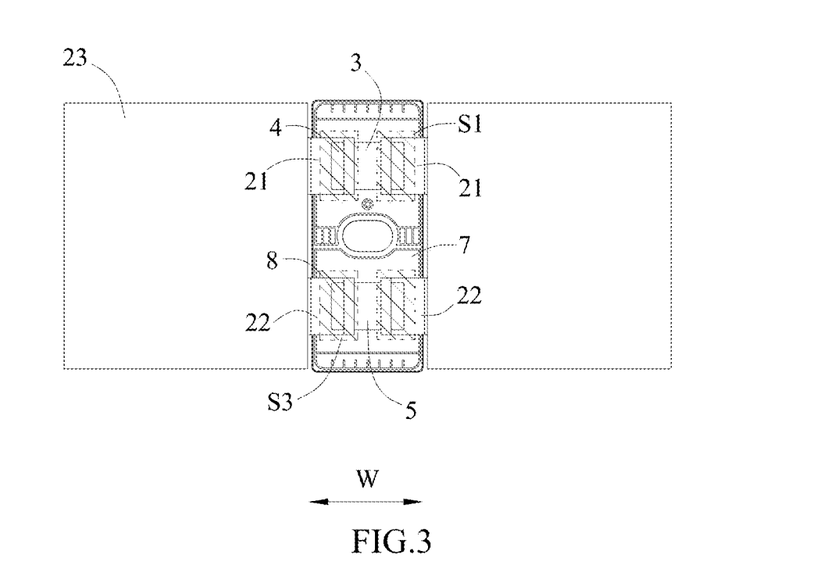
FIG. 3 is still another schematic view of the secondary battery according to the present disclosure.

In the secondary battery according to the present disclosure, referring to FIG. 4, the first insulating adhesive S1 is adhered on the first connecting portion 211, and the first insulating adhesive S1 extends and covers an inside portion of the first connecting portion 211 and an inside portion of the first bending portion 212. Referring to FIG. 3, the first insulating adhesive S1 is directly adhered on the first electrode tab 21 before the first electrode tab 21 is bent (the first electrode tab 21 forms the first connecting portion 211 and the first bending portion 212 after bent).

In the secondary battery according to the present disclosure, referring to FIG. 5, the first connecting portion 211 is positioned above the first connecting piece 3 in the height direction H, and the lower surface of the first connecting portion 211 is securely connected with the upper surface of the first connecting piece 3. At this time, both the upper surface of the first connecting portion 211 and the lower surface of the first connecting piece 3 are formed with weld zones, and the first insulating adhesive S1 is provided on the weld zones in the lower surface of the first connecting piece 3.

In the secondary battery according to the present disclosure, referring to FIG. 5, the first insulating adhesive S1 is adhered on the first connecting piece 3, and the first insulating adhesive S1 extends and covers the inside portion of the first bending portion 212.

In the secondary battery according to the present disclosure, referring to FIG. 1, FIG. 4, FIG. 5 and FIG. 6, the secondary battery further comprises a first welding protecting piece 4 provided on the first connecting portion 211. The first welding protecting piece 4, the first connecting portion 211 and the first connecting piece 3 are securely connected together by ultrasonic welding; correspondingly, the first insulating adhesive S1 is adhered on the weld zones which are formed during the ultrasonic welding and face the main body 23 of the electrode assembly 2. The first welding protecting piece 4 can improve connection strength between the connecting section 211 and the first connecting piece 3. The first connecting portion 211 is fixed between the first welding protecting piece 4 and the first connecting piece 3, so the weld zones are formed in the first welding protecting piece 4 and the first connecting piece 3 after the ultrasonic welding, and the first insulating adhesive S1 is adhered on the weld zones facing the main body 23 of the electrode assembly 2.

In some embodiments, referring to FIGS. 4-6, the first welding protecting piece 4, the first connecting portion 211 and the first connecting piece 3 are at least partially overlapped in the height direction H.

In some embodiments, referring to FIG. 4, the first connecting portion 211 is positioned below the first connecting piece 3 in the height direction H, and the first welding protecting piece 4 is positioned below the first connecting portion 211 in the height direction H. At least a part of the first insulating adhesive S1 is adhered on a surface of the first welding protecting piece 4 away from the first connecting portion 211. The first insulating adhesive S1 comprises a first portion and a second portion connected with the first portion, the first portion is adhered on the surface of the first welding protecting piece 4 away from the first connecting portion 211, the second portion is positioned at a side of the first welding protecting piece 4 in a width direction W, and the second portion is adhered with a part of the first connecting portion 211 exceeding the first welding protecting piece 4 in the width direction W. In the height direction H, a step is formed between the first portion and the second portion, and the first portion is closer to the main body 23 than the second portion.

In some embodiments, referring to FIG. 5, the first connecting portion 211 is positioned above the first connecting piece 3 in the height direction H, and the first welding protecting piece 4 is positioned above the first connecting portion 211 in the height direction H. At least a part of the first insulating adhesive S1 is adhered on a surface of the first connecting piece 3 away from the first connecting portion 211.

Figure 1:
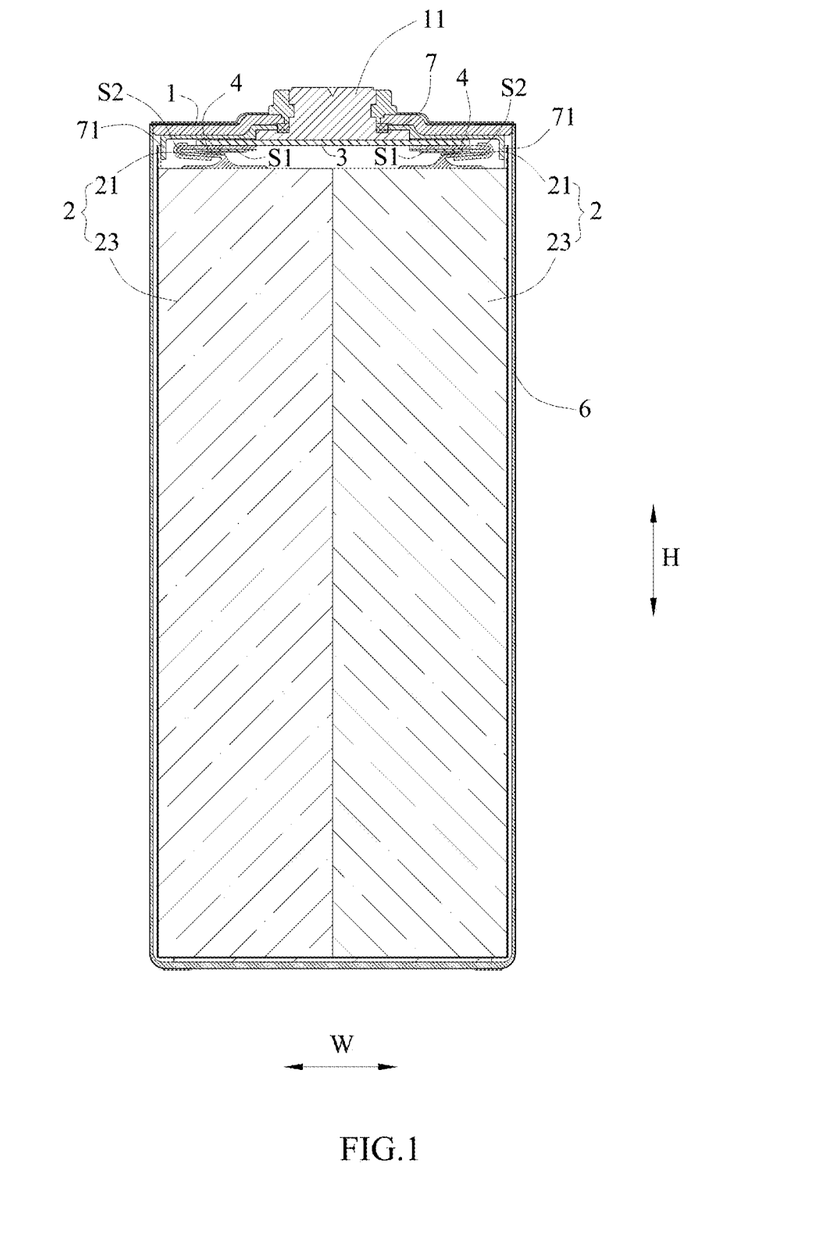
FIG. 1 is a schematic view of a secondary battery according to the present disclosure.
Figure 2:
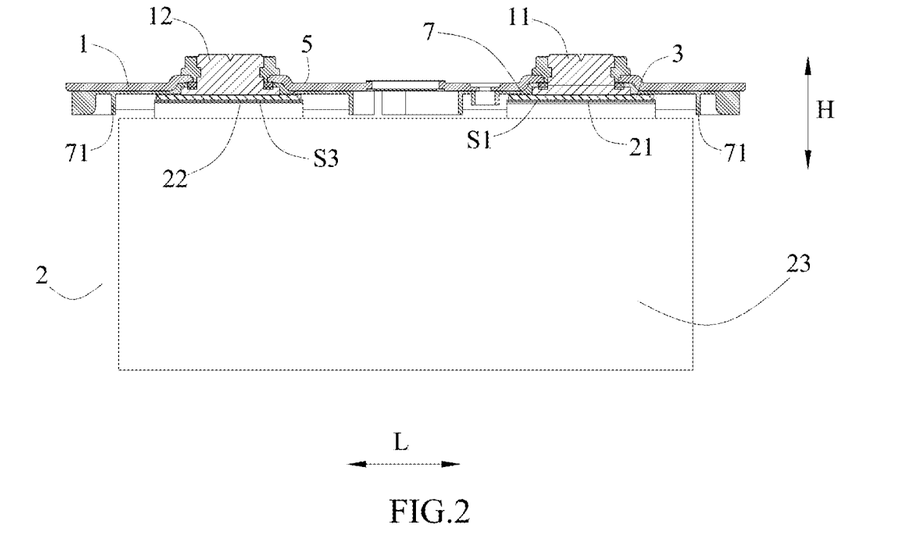
FIG. 2 is another schematic view of the secondary battery according to the present disclosure with a case removed.

In the secondary battery according to the present disclosure, referring to FIG. 1, the secondary battery further comprises a case 6 and an insulating frame 7, the case 6 receives the electrode assembly 2 and is assembled with the cap plate 1, and the insulating frame 7 is received in the case 6 and isolates the cap plate 1 from the electrode assembly 2. Two ends of the insulating frame 7 in a width direction W are provided with side edges 71 extending downwardly, and two ends of the insulating frame 7 in a length direction L are provided with side edges 71 extending downwardly, all the side edges 71 can isolate the first electrode tab 21 and the second electrode tab 22 from the case 6, thereby avoiding the first electrode tab 21 and the second electrode tab 22 contacting the case 6 and preventing short circuit.

Figure 7:
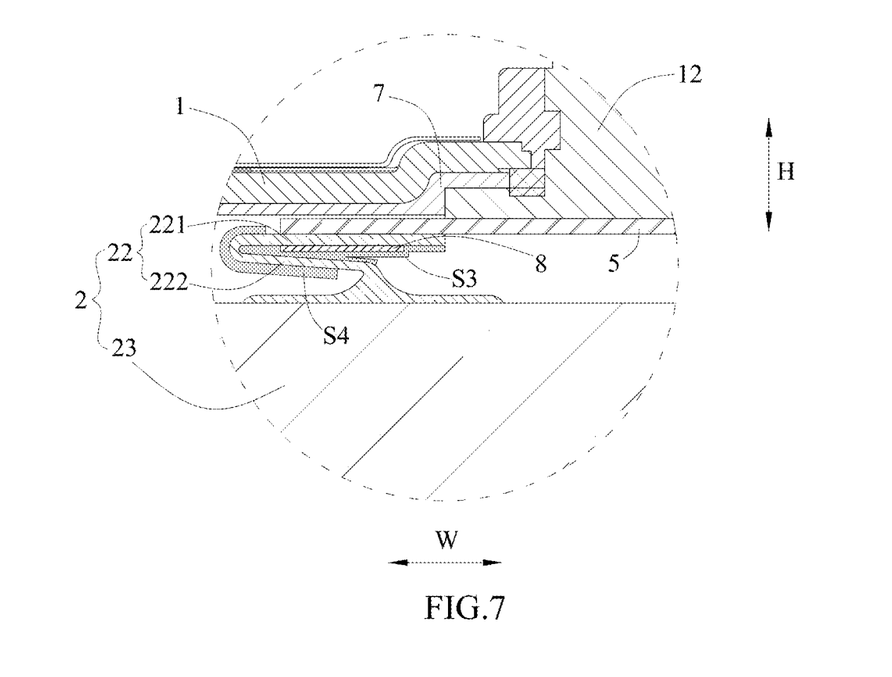
FIGS. 7-9 are schematic views of different embodiments of a second electrode tab of the secondary battery according to the present disclosure.
Figure 8:
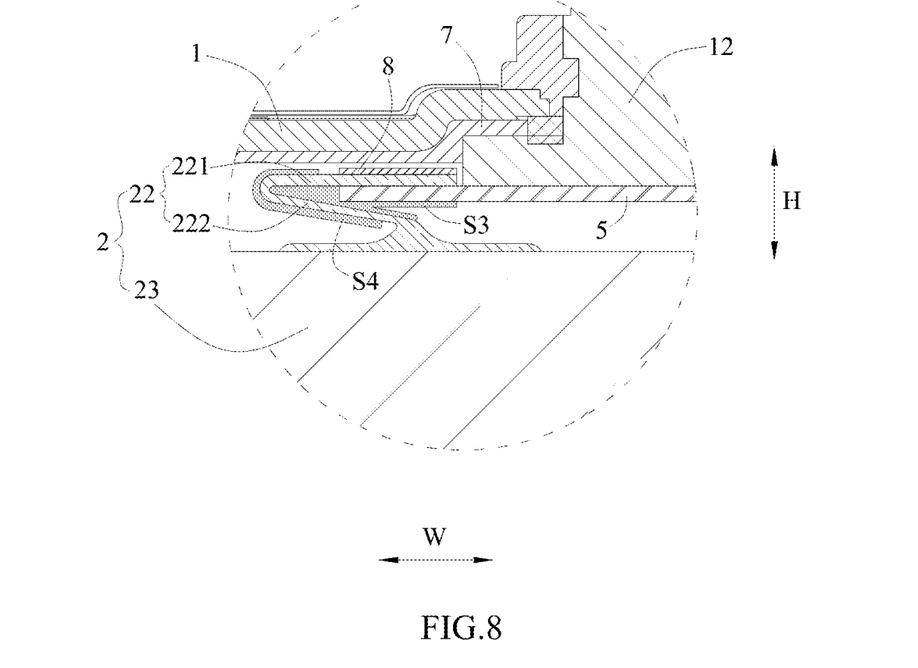
Figure 9:
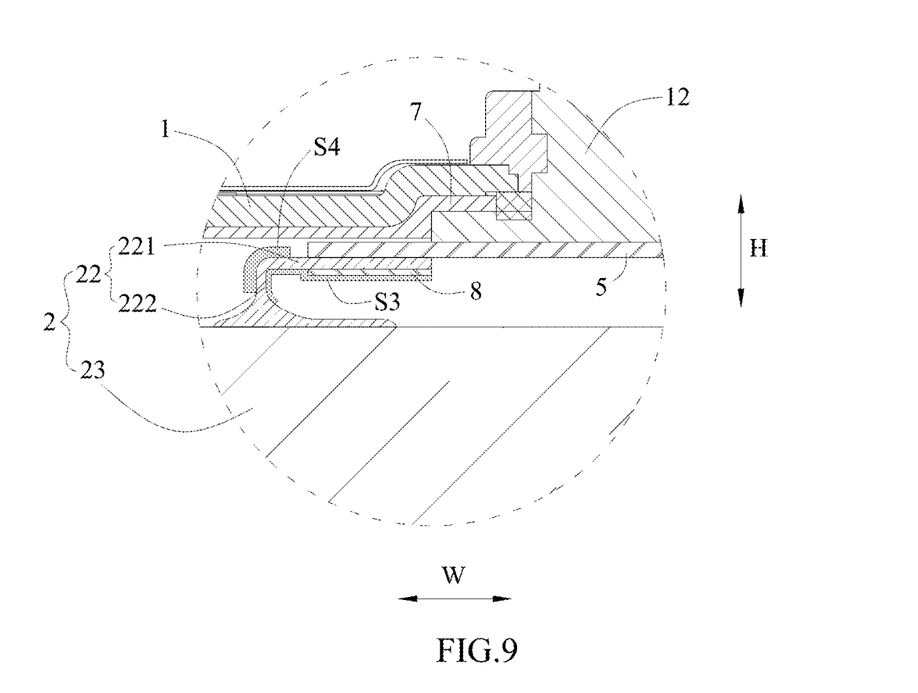

In the secondary battery according to the present disclosure, referring to FIGS. 7-9, the secondary battery further comprises a second connecting piece 5 connected in series between the second electrode terminal 12 and the second electrode tab 22. The second electrode tab 22 includes a second connecting portion 221 and a second bending portion 222, the second connecting portion 221 is welded with the second connecting piece 5, and the second bending portion 222 is bent downwardly and connected between the main body 23 of the electrode assembly 2 and the second connecting portion 221. A third insulating adhesive S3 is adhered on weld zones which are formed during welding of the second connecting portion 221 and the second connecting piece 5 and face the main body 23 of the electrode assembly 2.

In the secondary battery according to the present disclosure, the third insulating adhesive S3 can cover the weld zones facing the main body 23 of the electrode assembly 2, so the third insulating adhesive S3 can isolate the weld zones from the main body 23 or the second bending portion 222, and avoid the weld zones damaging the main body 23 of the electrode assembly 2 or the second bending portion 222 in the assembling process and the working process of the secondary battery, thereby improving the safety performance of the secondary battery. At the same time, the third insulating adhesive S3 is fixed to the weld zones by adhering, so the assembling process is simple and the stability is good; compared to the prior art, a thickness of the third insulating adhesive S3 is small, thereby saving space and improving the energy density of the secondary battery. Moreover, the third insulating adhesive S3 also can avoid the short circuit caused by contact between the weld zones and the main body 23 of the electrode assembly 2 (that is an electrode plate of the main body 23 which is opposite to the second electrode tab 22 in electrical polarity).

In the secondary battery according to the present disclosure, referring to FIGS. 7-9, a fourth insulating adhesive S4 is adhered on an outside portion of the second bending portion 222. In the assembling process of the secondary battery, in order to improve the energy density of the secondary battery, the second bending portion 222 will be pressed down and bent, and the outside portion of the second bending portion 222 may will easily contact the case 6 and the main body 23 of the electrode assembly 2, thereby resulting in short circuit; however, it can avoid the outside portion of the second bending portion 222 contacting the case 6 and the main body 23 of the electrode assembly 2 by provision of the fourth insulating adhesive S4 adhered on the outside portion of the second bending portion 222, thereby preventing short circuit and improving the safety performance of the secondary battery.

In the secondary battery according to the present disclosure, referring to FIG. 9, an angle between the second connecting portion 221 and the second bending portion 222 ranges from 85 degrees to 95 degrees. At this time, the second bending portion 222 extends nearly along the height direction H, so as to prevent the second bending portion 222 from being pressed down and bent, avoid the outside portion of the second bending portion 222 contacting the case 6 and the main body 23 of the electrode assembly 2.

In the secondary battery according to the present disclosure, referring to FIG. 7 and FIG. 8, the angle between the second connecting portion 221 and the second bending portion 222 ranges from 0 degrees to 45 degrees. At this time, the second bending portion 222 nearly folds back onto the second connecting portion 221, thereby effectively reducing the space occupied by the second bending portion 222, and promoting a utilization rate of the space inside the secondary battery.

In the secondary battery according to the present disclosure, referring to FIG. 7, the second connecting portion 221 is positioned below the second connecting piece 5 in the height direction H and an upper surface of the second connecting portion 221 is securely connected with a lower surface of the second connecting piece 5. At this time, both a lower surface of the second connecting portion 221 and an upper surface of the second connecting piece 5 are formed with weld zones, and the third insulating adhesive S3 is provided on the weld zones in the lower surface of the second connecting portion 221.

In the secondary battery according to the present disclosure, referring to FIG. 7, the third insulating adhesive S3 is adhered on the second connecting portion 221, and the third insulating adhesive S3 extends and covers an inside portion of the second connecting portion 221 and an inside portion of the second bending portion 222. Referring to FIG. 3, the third insulating adhesive S3 is directly adhered on the second electrode tab 22 before the second electrode tab 22 is bent (the second electrode tab 22 forms the second connecting portion 221 and the second bending portion 222 after bent).

In the secondary battery according to the present disclosure, referring to FIG. 8, the second connecting portion 221 is positioned above the second connecting piece 5 in the height direction H, and the lower surface of the second connecting portion 221 is securely connected with the upper surface of the second connecting piece 5. At this time, both the upper surface of the second connecting portion 221 and the lower surface of the second connecting piece 5 are formed with weld zones, and the third insulating adhesive S3 is provided on the weld zones in the lower surface of the second connecting piece 5.

In the secondary battery according to the present disclosure, referring to FIG. 8, the third insulating adhesive S3 is adhered on the second connecting piece 5, and the third insulating adhesive S3 extends and covers the inside portion of the second bending portion 222.

In the secondary battery according to the present disclosure, referring to FIG. 1, FIG. 7, FIG. 8 and FIG. 9, the secondary battery further comprises a second welding protecting piece 8 provided on the second connecting portion 221. The second welding protecting piece 8, the second connecting portion 221 and the second connecting piece 5 are securely connected together by ultrasonic welding; correspondingly, the third insulating adhesive S3 is adhered on the weld zones which are formed during the ultrasonic welding and face the main body 23 of the electrode assembly 2. The second welding protecting piece 8 can improve connection strength between the second connecting portion 221 and the second connecting piece 5. The second connecting portion 221 is fixed between the second welding protecting piece 8 and the second connecting piece 5, so the weld zones are formed in the second welding protecting piece 8 and the second connecting piece 5 after the ultrasonic welding, and the third insulating adhesive S3 is adhered on the weld zones facing the main body 23 of the electrode assembly 2.

What is claimed is:

1. A secondary battery, comprising:
   a cap plate provided with a first electrode terminal;
   an electrode assembly comprising a main body and a first electrode tab provided to the main body, the first electrode tab comprising a first connecting portion;
   a first connecting piece connected between the first connecting portion and the first electrode terminal; and
   a first welding protecting piece provided on the first connecting portion, the first connecting portion being positioned between the first welding protecting piece and the first connecting piece, and the first welding protecting piece, the first connecting portion and the first connecting piece being securely connected.

2. The secondary battery according to claim 1, wherein the first electrode tab further comprises a first bending portion, and the first bending portion is bent downwardly and connected between the main body of the electrode assembly and the first connecting portion.

3. The secondary battery according to claim 2, wherein the first welding protecting piece, the first connecting portion and the first connecting piece are at least partially overlapped in a height direction.

4. The secondary battery according to claim 2, wherein the first welding protecting piece, the first connecting portion and the first connecting piece are welded together and form weld zones facing the main body of the electrode assembly;
   the secondary battery further comprises a first insulating adhesive adhered on the weld zones facing the main body of the electrode assembly.

5. The secondary battery according to claim 4, wherein the first connecting portion is positioned below the first connecting piece in a height direction, and the first welding protecting piece is positioned below the first connecting portion in the height direction;
   at least a part of the first insulating adhesive is adhered on a surface of the first welding protecting piece away from the first connecting portion.

6. The secondary battery according to claim 5, wherein the first insulating adhesive comprises a first portion and a second portion connected with the first portion, the first portion is adhered on the surface of the first welding protecting piece away from the first connecting portion, the second portion is positioned at a side of the first welding protecting piece in a width direction, and the second portion is adhered with a part of the first connecting portion exceeding the first welding protecting piece in the width direction.

7. The secondary battery according to claim 6, wherein in the height direction, a step is formed between the first portion and the second portion, and the first portion is closer to the main body than the second portion.

8. The secondary battery according to claim 4, wherein the first connecting portion is positioned above the first connecting piece in a height direction, and the first welding protecting piece is positioned above the first connecting portion in the height direction;
   at least a part of the first insulating adhesive is adhered on a surface of the first connecting piece away from the first connecting portion.

9. The secondary battery according to claim 2, wherein the secondary battery further comprises a second insulating adhesive adhered on an outside portion of the first bending portion.

10. The secondary battery according to claim 2, wherein
    an angle between the first connecting portion and the first bending portion ranges from 85 degrees to 95 degrees; or
    an angle between the first connecting portion and the first bending portion ranges from 0 degrees to 45 degrees.

11. The secondary battery according to claim 1, wherein the secondary battery further comprises a case and an insulating frame, the case receives the electrode assembly and is assembled with the cap plate, and the insulating frame is received in the case and isolates the cap plate from the electrode assembly;
    two ends of the insulating frame in a width direction are provided with side edges extending downwardly, and two ends of the insulating frame in a length direction are provided with side edges extending downwardly, all the side edges isolate the first electrode tab from the case.

12. The secondary battery according to claim 1, wherein the cap plate is provided with a second electrode terminal, the electrode assembly further comprises a second electrode tab provided to the main body, and the second electrode tab comprises a second connecting portion;
    the secondary battery further comprises a second connecting piece and a second welding protecting piece, the second connecting piece is connected between the second electrode terminal and the second connecting portion, and the second welding protecting piece is provided on the second connecting portion;
    the second connecting portion is positioned between the second connecting piece and the second welding protecting piece, and the second connecting piece, the second connecting portion and the second welding protecting piece are securely connected.

13. The secondary battery according to claim 12, wherein the second electrode tab further comprises a second bending portion, and the second bending portion is bent downwardly and connected between the main body of the electrode assembly and the second connecting portion.

14. The secondary battery according to claim 12, wherein the second welding protecting piece, the second connecting portion and the second connecting piece are welded together and form weld zones facing the main body of the electrode assembly;
    the secondary battery further comprises a second insulating adhesive adhered on the weld zones facing the main body of the electrode assembly.

\* \* \* \* \*